United States Patent
Bastide et al.

(10) Patent No.: US 10,887,263 B2
(45) Date of Patent: *Jan. 5, 2021

(54) DYNAMIC THREAD MANAGEMENT FOR ONLINE CONVERSATIONS

(71) Applicant: INTERNATIONAL BUSINESS MACHINES CORPORATION, Armonk, NY (US)

(72) Inventors: Paul R. Bastide, Boxford, MA (US); Matthew E. Broomhall, Goffstown, NH (US); Robert E. Loredo, North Miami Beach, FL (US); Dale M. Schultz, Limerick, ME (US)

(73) Assignee: International Business Machines Corporation, Armonk, NY (US)

( * ) Notice: Subject to any disclaimer, the term of this patent is extended or adjusted under 35 U.S.C. 154(b) by 149 days.

This patent is subject to a terminal disclaimer.

(21) Appl. No.: 16/017,063

(22) Filed: Jun. 25, 2018

(65) Prior Publication Data
US 2018/0309707 A1    Oct. 25, 2018

Related U.S. Application Data (63) Continuation of application No. 14/670,547, filed on Mar. 27, 2015, now Pat. No. 10,050,918.

(51) Int. Cl.
*H04L 12/58* (2006.01)
*H04L 29/08* (2006.01)
(Continued)

(52) U.S. Cl.
CPC .......... *H04L 51/16* (2013.01); *G06Q 10/107* (2013.01); *H04L 51/32* (2013.01); *H04L 51/34* (2013.01); *G06Q 50/01* (2013.01); *H04L 67/306* (2013.01)

(58) Field of Classification Search
CPC . H04L 63/1425; H04L 12/1813; H04L 65/40; G06F 15/16
(Continued)

(56) References Cited

U.S. PATENT DOCUMENTS 7,200,635 B2   4/2007  Yashchin et al.
8,332,477 B1   12/2012 Kaiserlian et al.
(Continued)

OTHER PUBLICATIONS

Anonymous, "A Method and System for Managing the Relevance of Correspondences," An IP.com Prior Art Database Technical Disclosure, Apr. 2, 2015, p. 1-3, IP.com No. IPCOM000241198D.
(Continued)

*Primary Examiner* — Tesfay Yohannes
(74) *Attorney, Agent, or Firm* — Dmitry Paskalov (57) ABSTRACT

A method for creating at least one new thread associated with an online conversation is provided. The method may include monitoring the online conversation to detect a new or updated element of the online conversation. The method may also include extracting the detected new or updated element. The method may further include analyzing the online conversation and the extracted detected new or updated element to determine if a new online conversation has started. The method may include extracting a plurality of members associated with the online conversation. The method may also include extracting a plurality of content associated with the extracted detected new or updated element. The method additionally include prompting a user to determine if a new online conversation should be created. The method may also include creating the new online conversation. The method may further include notifying the plurality of extracted members about the created new online conversation.

17 Claims, 5 Drawing Sheets

(51) Int. Cl.
*G06Q 10/10* (2012.01)
*G06Q 50/00* (2012.01)

(58) Field of Classification Search
USPC .................................................. 709/206, 223
See application file for complete search history.

(56) References Cited

U.S. PATENT DOCUMENTS

| | | | |
|---|---|---|---|
| 8,412,679 B1 | 4/2013 | Venkatesan | |
| 8,510,399 B1 * | 8/2013 | Byttow | H04L 51/04 709/206 |
| 8,700,719 B1 * | 4/2014 | Covitz | G06Q 10/107 709/206 |
| 8,751,559 B2 | 6/2014 | Richardson et al. | |
| 8,805,935 B2 | 8/2014 | Kirkland et al. | |
| 9,177,293 B1 * | 11/2015 | Gagnon | G06Q 10/107 |
| 9,330,422 B2 * | 5/2016 | Bourdaillet | G06Q 50/01 |
| 9,619,522 B2 | 4/2017 | Bastide et al. | |
| 2006/0174340 A1 | 8/2006 | Santos et al. | |
| 2007/0214097 A1 * | 9/2007 | Parsons | G06Q 30/0264 706/12 |
| 2007/0271336 A1 | 11/2007 | Ramaswamy | |
| 2007/0299915 A1 * | 12/2007 | Shraim | H04L 63/1491 709/206 |
| 2009/0119173 A1 * | 5/2009 | Parsons | G06Q 30/02 705/319 |
| 2010/0070485 A1 | 3/2010 | Parsons et al. | |
| 2010/0325107 A1 * | 12/2010 | Kenton | G06Q 30/00 707/723 |
| 2011/0307403 A1 | 12/2011 | Rostampour et al. | |
| 2012/0158935 A1 * | 6/2012 | Kishimoto | G06Q 10/10 709/223 |
| 2013/0031487 A1 | 1/2013 | Olsen et al. | |
| 2014/0089440 A1 | 3/2014 | Buchheit et al. | |
| 2014/0201125 A1 | 7/2014 | Moeinifar et al. | |
| 2014/0280621 A1 * | 9/2014 | Bourdaillet | G06Q 50/01 709/206 |
| 2016/0212022 A1 * | 7/2016 | Abou Mahmoud | H04L 51/34 |
| 2016/0285807 A1 | 9/2016 | Bastide et al. | |

OTHER PUBLICATIONS

Cano et al., "Capturing Entity-Based Semantics Emerging from Personal Awareness Streams," Proceedings of the 1st Workshop on Making Sense of Microposts (#MSM2011), May 30, 2011, p. 33-44, Heraklion, Greece.

Cogan et al., "Reconstruction and Analysis of Twitter Conversation Graphs," ACM HotSocial'12, Aug. 2012, p. 25-31, ACM, Beijing, China.

IBM, "Analyzing Survey Text: A Brief Overview," IBM Business Analytics Software, May 2010, p. 1-11, IBM Corporation.

IBM, "IBM SPSS Statistics Editions," IBM Business Analytics Software, Apr. 2013, p. 1-7, IBM Corporation.

Mell et al., "The NIST Definition of Cloud Computing," National Institute of Standards and Technology, Information Technology Laboratory, Oct. 7, 2009, 2 Pages, Version 15.

Wikipedia, "Natural language processing," Wikipedia: the Free Encyclopedia, Last Modified on Mar. 3, 2015, p. 1-10, http://en.wikipedia.org/wiki/Natural_language_processing, Accessed on: Mar. 4, 2015.

* cited by examiner

DYNAMIC THREAD MANAGEMENT FOR ONLINE CONVERSATIONS

BACKGROUND

The present invention relates generally to the field of computers, and more particularly to online conversations.

Online mail clients and online social networks are universal mechanisms to engage people in conversation. The most common of these mechanisms are the inbox, wall, activity stream, timeline or profile. Often in conversations, there are latent indicators which enable one to establish or determine expertise, develop a common understanding or trigger a short-circuit of the conversation.

SUMMARY

According to one embodiment, a method for creating at least one new thread associated with an online conversation is provided. The method may include monitoring the online conversation to detect a new or updated element of the online conversation. The method may also include extracting the detected new or updated element. The method may further include analyzing the online conversation and the extracted detected new or updated element to determine if a new online conversation has started. The method may include extracting a plurality of members associated with the online conversation based on the determination that a new online conversation has started. The method may also include extracting a plurality of content associated with the extracted detected new or updated element based on the determination that a new online conversation has started. The method additionally include prompting a user to determine if a new online conversation should be created. The method may also include creating the new online conversation based on the user determining that the new conversation should be created. The method may further include notifying the plurality of extracted members about the created new online conversation.

According to another embodiment, a computer system a method for creating at least one new thread associated with an online conversation is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include monitoring the online conversation to detect a new or updated element of the online conversation. The method may also include extracting the detected new or updated element. The method may further include analyzing the online conversation and the extracted detected new or updated element to determine if a new online conversation has started. The method may include extracting a plurality of members associated with the online conversation based on the determination that a new online conversation has started. The method may also include extracting a plurality of content associated with the extracted detected new or updated element based on the determination that a new online conversation has started. The method additionally include prompting a user to determine if a new online conversation should be created. The method may also include creating the new online conversation based on the user determining that the new conversation should be created. The method may further include notifying the plurality of extracted members about the created new online conversation.

According to yet another embodiment, a computer program product a method for creating at least one new thread associated with an online conversation is provided. The computer program product may include one or more computer-readable storage devices and program instructions stored on at least one of the one or me tangible storage devices, the program instructions executable by a processor. The computer program product may include program instructions to monitor the online conversation to detect a new or updated element of the online conversation. The computer program product may also include program instructions to extract the detected new or updated element. The computer program product may further include program instructions to analyze the online conversation and the extracted detected new or updated element to determine if a new online conversation has started. The computer program product may include program instructions to extract a plurality of members associated with the online conversation based on the determination that a new online conversation has started. The computer program product may also include program instructions to extract a plurality of content associated with the extracted detected new or updated element based on the determination that a new online conversation has started. The computer program product additionally include program instructions to prompt a user to determine if a new online conversation should be created. The computer program product may also include program instructions to create the new online conversation based on the user determining that the new conversation should be created. The computer program product may further include program instructions to notify the plurality of extracted members about the created new online conversation.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to online conversations. The following described exemplary embodiments provide a system, method and program product to, among other things, manage a dynamic thread for online conversations. Therefore, the present embodiment has the capacity to improve the technical field of online conversations by managing the audience of online conversations. More specifically, the present embodiment may monitor an online forum or conversation for new conversation elements and extract the new part of the conversation (content and members). Additionally, the present embodiment may create a new conversation (i.e., a new thread) based on the content of the extracted new part of the conversation and notify members of the previous conversation. As such, the present embodiment may create a new thread based on the content of an existing thread changing and suggest new participants when a change (e.g., the topic has changed) is detected.

As previously described, online mail clients, such as Google Gmail® (Google Gmail and all Google Gmail-based trademarks and logos are trademarks or registered trademarks of Google and/or its affiliates) and online social networks, such as Facebook® (Facebook and all Facebook-based trademarks and logos are trademarks or registered trademarks of Facebook and/or its affiliates) and Twitter (Twitter and all Twitter-based trademarks and logos are trademarks or registered trademarks of Twitter, Inc. and/or its affiliates) are universal mechanisms to engage people in conversation. The most common of these mechanisms are the inbox, wall, activity stream, timeline or profile. Often in conversations, there are latent indicators which enable one to establish or determine expertise, develop a common understanding or trigger a short-circuit of the conversation. For an example in verbal speech, a user calling a technical support person with the issue "my internet button doesn't work" may be treated differently from another user with the same problem, saying "traceroutes are failing between your branch and the upstream provider."

However, often, these key indicators may be missed in online conversations due to persons who may be unfamiliar with or have foreign backgrounds with respect to the relevant subject matter. Additionally, there is a need to optimize online conversations so the online conversations do not clutter the activity stream or inbox with unneeded messages. For example, User A (using an online-social network) may post to User B and User B may respond. However, a period of time may pass and User C may see the post in his/her stream (or via a search) and post to User B. Then User B may respond to User C and User A's stream is updated with the out of date or out of synch message. As such, User A's activity stream may be cluttered with unneeded messages from the online conversation between User B and User C. As such, it may be advantageous, among other things, to manage a dynamic thread for online conversations.

According to at least one implementation, the present embodiment may manage the audience of online conversations, by monitoring an online forum or online conversation for new conversation elements and analyzing the existing conversation and the new part of the conversation. Then, based on the analysis of the existing conversation, the present embodiment may determine if the new part of the conversation diverges from the preceding conversation and as such, extract the new part of the conversation (content and members) to create a new conversation based on the new part of the conversation (i.e., the content) and notify members of the previous conversation (i.e., the members). Therefore, the present embodiment may optimize online conversations by improving attention management and allowing members of an online conversation to focus on the interesting and relevant parts of the conversation without cluttering the activity stream or inbox with unneeded messages.

As such, the present embodiment can detect new conversation elements or topic changes in online conversations and separate the new conversation elements or topic changes from current conversation threads. More specifically, the present embodiment extracts the new conversation elements or topic changes based on parameters such as new topics, change of technical details, change of tone, different user and time delay from a preceding conversation thread and creates a new conversation thread. Then, the participants of the current conversation may be notified about the initiation of the new conversation thread and the user may be enabled to add relevant members to the new conversation thread.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to manage a dynamic thread for online conversations. According to at least one implementation, the present embodiment may monitor online conversations for new or updated messages in a conversation. As such, the present embodiment may extract the corresponding new element and preceding conversation elements. Then, the existing conversation and the new part of the conversation may be analyzed to determine if a new conversation should be created. If it is determined that a new conversation needs to be created, then the user may be prompted to accept the creation of the new conversation or decline the creation of the new conversation and continue with the post.

For example, User A (using an online-social network) may post to User B and User B may respond. However, a period of time may pass and User C may see the post in his/her stream (or via a search) and begins posting. However, before posting, the present embodiment may prompt User C that a new conversation is appropriate. Then User C may select User A and User B to be notified. As such, a new conversation is created and the present embodiment notifies User A and User B of the new conversation. Then, if User B responds, User A will not receive the response and can safely ignore the messages.

Figure 1:
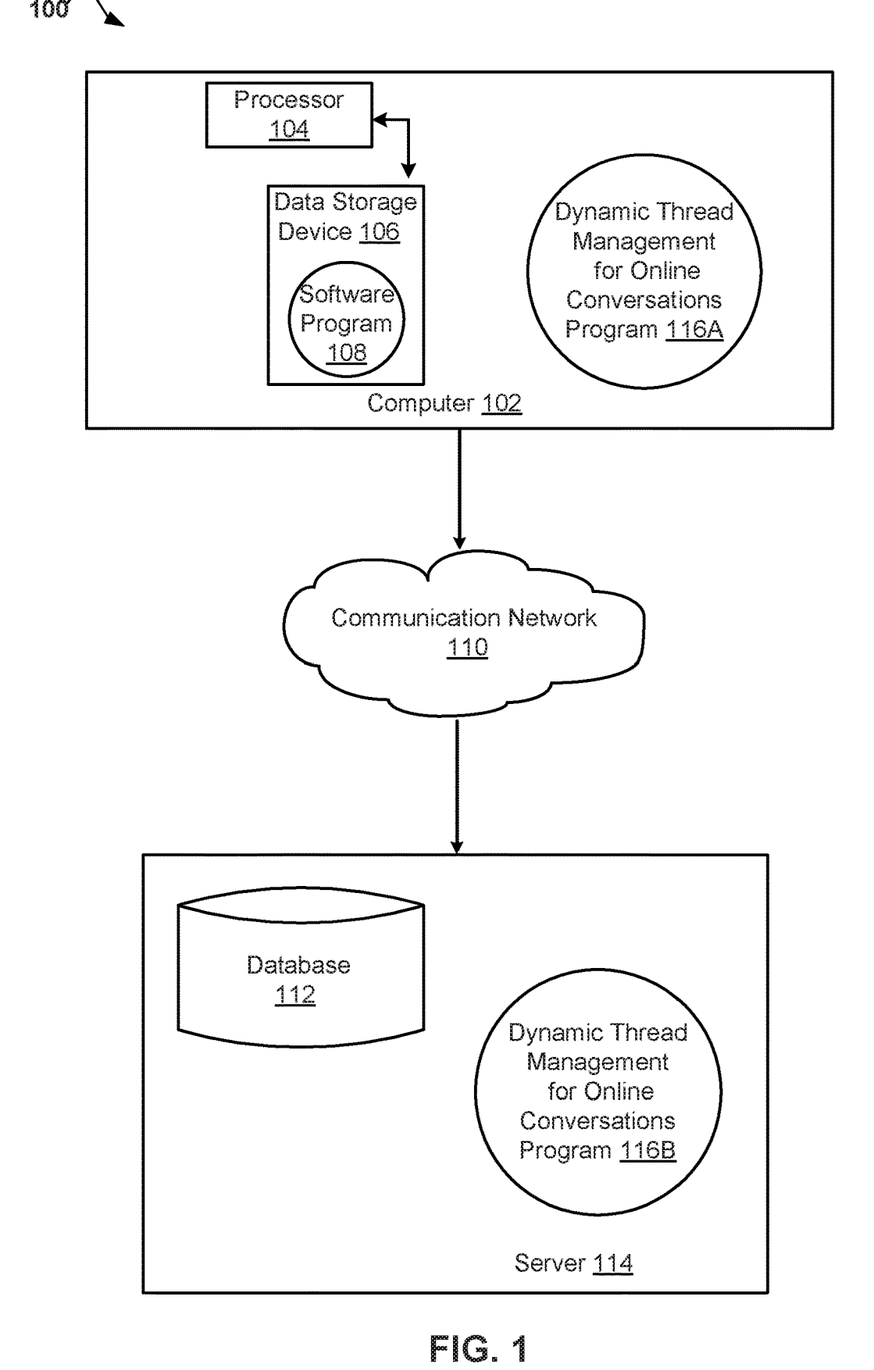
FIG. 1 illustrates a networked computer environment according to one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a Dynamic Thread Management for Online Conversations program 116A. The networked computer environment 100 may also include a server 114 that is enabled to run a Dynamic Thread Management for Online Conversations program 116B that may interact with a database 112 and a communication network 110. The networked computer environment 100 may include a plurality of computer 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Dynamic Thread Management for Online Conversations program 116B running on server computer 114 via the communications network 110. The communications network 110 may include connections, such as wire, wireless communication links, or fiber optic cables. As will be discussed with reference to FIG. 3, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Dynamic Thread Management for Online Conversations program 116A, 116B may interact with a database 112 that may be embedded in various storage devices, such as, but not limited to a computer/mobile device 102, a networked server 114, or a cloud storage service.

As previously described, the client computer 102 may access the Dynamic Thread Management for Online Conversations program 116B, running on server computer 114 via the communications network 110. For example, a user using a client computer 102 may utilize the Dynamic Thread Management for Online Conversations program 116A, 116B to monitor online conversations for new or updated messages in a conversation. As such, the Dynamic Thread Management for Online Conversations program 116A, 116B may extract the corresponding new element and preceding conversation elements. Then, the existing conversation and the new part of the conversation may be analyzed to determine if a new conversation should be created. If it is determined that a new conversation needs to be created, then the user may be prompted to accept the creation of the new conversation or decline the creation of the new conversation and continue with the post. The Dynamic Thread Management for Online Conversations method is explained in more detail below with respect to FIG. 2.

Figure 2:
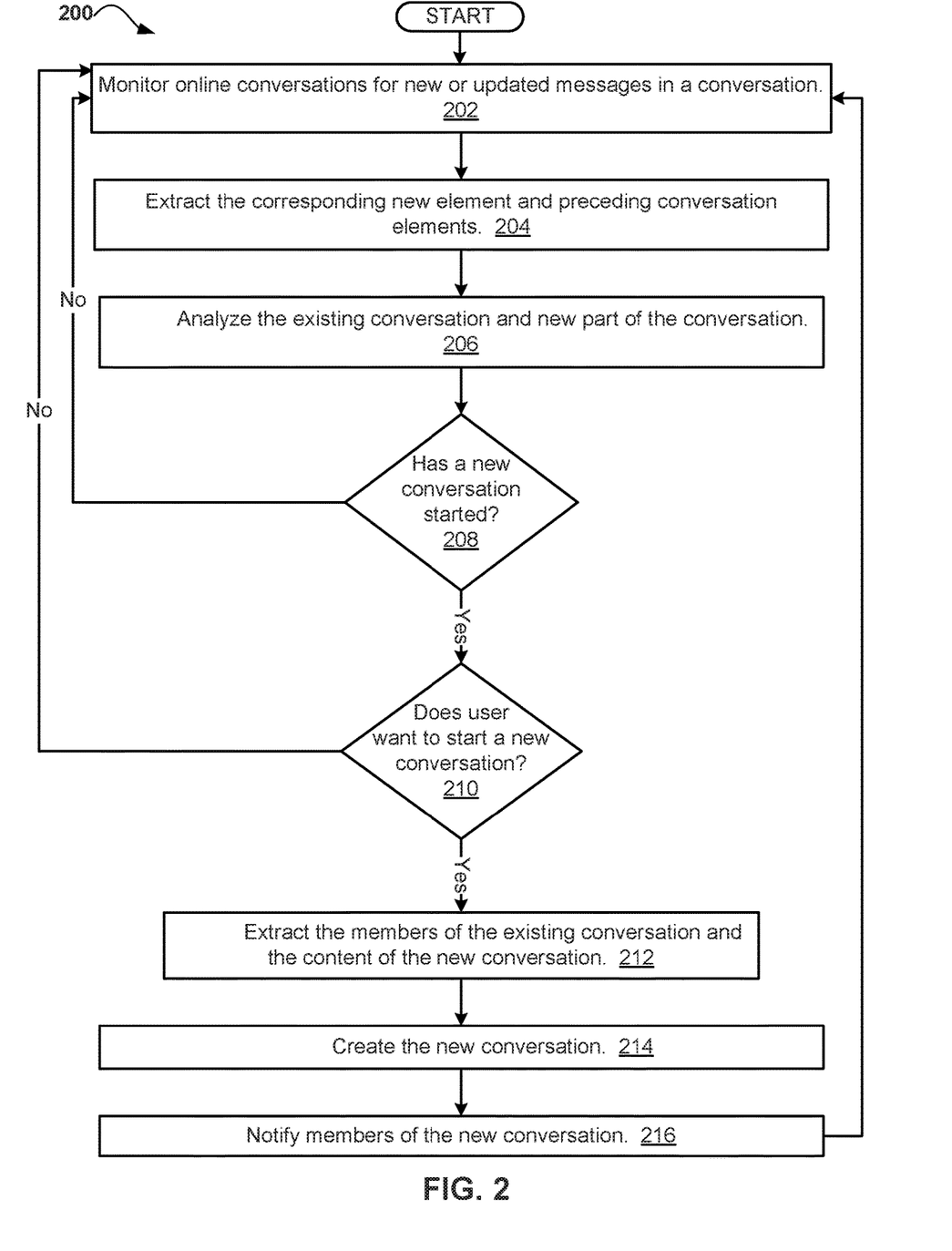
FIG. 2 is an operational flowchart illustrating the steps carried out by a program that enables dynamic thread management for online conversations.

Referring now to FIG. 2, an operational flowchart 200 illustrating the steps carried out by a program that enables dynamic thread management for online conversations. As previously described, the present embodiment operates in any environment that enables messaging, such as, but not limited to an instant messaging (IM) service, a short message service (SMS), a blog, a web site, a community, a news feed, an email application, a forum and a wiki. For example, the present embodiment may operate in a collaboration environment, such as email; any online Social Network (Asymmetric (I follow), such as Twitter® and Symmetric (I connect), such as Facebook®); and other applications.

Therefore with respect to FIG. 2 at 202, the Dynamic Thread Management for Online Conversations program 116A, 116B (FIG. 1) monitors online conversations for new or updated messages in a conversation. Therefore according to at least one implementation, various social networks can implement compliance interfaces. For example, the online social networks may implement application program interfaces (APIs) that make it possible to check for updated content, and retrieve corresponding conversation details. As such, the present embodiment may monitor the post/update methods as they stream into the server/API, and activate an analysis. Additionally, the present embodiment may monitor the user interface and watch for Edit/Reply To or other actions in order to trigger analysis.

Then at 204, the Dynamic Thread Management for Online Conversations program 116A, 116B (FIG. 1) extracts the corresponding new element and preceding conversation elements. As such, the present embodiment analyzes the elements of the conversation which precede the current post and may ignore any subsequent replies to the conversation elements.

Next at 206, the Dynamic Thread Management for Online Conversations program 116A, 116B (FIG. 1) analyzes the existing conversation and the new part of the conversation by analyzing the natural language. As such, the natural language markers are extracted from the preceding elements and the natural language markers are extracted from the new element.

Then at 208, it is determined whether a new conversation has started based on the analysis of the conversation. As such, the overlap in the elements are compared. If the overlap is under a set threshold or statistically significant, the new part is marked as a new conversation. According to at least one implementation, the present embodiment may ignore certain phrases, such as "Thanks" "Helpful" or "Interesting". Additionally, the user may be prompted to notify everyone or a specific person. Furthermore, the present embodiment analyzes the time of the preceding posts, and the new post.

If at 208 it is determined that a new conversation has not started, then the method will continue to monitor online conversations at 202. However, if at 208 it is determined that a new conversation has started, then the method continues to step 210 where the user is prompted to accept the creation of the new conversation, or to decline the creation of the new conversation and continue the post. If at 210, the user declines the creation of the new conversation, then the post will be continued and the method will continue to monitor online conversations at 202.

However, if at 210, the user accepts the creation of the new conversation, then the method continues to step 212 to extract the members of the existing conversation and the content of the new conversation. As such, the person who creates the new part of the conversation is prompted to add required and optional people to the notifications of the new conversation. Additionally, according to at least one implementation, the present embodiment may suggest new participants. Then, all or part of the members of a conversation and new content of the conversation is extracted.

Next at 214, a new conversation is created. Therefore, a new conversation (i.e., a new thread) in a forum/activity stream or other medium is populated. Then at 216, the members of the new conversation are notified and the method may continue back to 202 to continue to monitor online conversations.

According to at least one implementation, if the difference of the preceding posts timestamp and the new post is outside a threshold, then a new conversation may be created (if the user accepts to create a new conversation). Also, if the conversation is outside a time expiry, the creation of the new conversation may also be implemented. Therefore, the present embodiment may analyze who is addressed, @mentioned or referred to in a conversation (Reply-To, etc.). As such, if the conversation is divergent from the original poster's conversation, the creation of the new conversation may be implemented.

Additionally, the present embodiment analyzes the vectors and direction of the conversation. Therefore, if the conversation diverges or changes vectors, the creation of the new conversation may be implemented. Also, the present embodiment analyzes the physical change of subject and topic. (e.g., explicit change in a forum entry). If it is determined that a physical change of the subject or topic has occurred, then a new conversation may be implemented.

The present embodiment may be implemented based on the number of notifications, the number of replies to a message or a post, or the number of messages. Additionally, a minimum depth may be required before the analysis is started. For example, a minimum number of comments or replies at a given level of a conversation. As such, the present embodiment may be implemented based on any number of custom metrics.

Furthermore, a new conversation may be triggered via hashtag, a button, typing a response, or other user interface gestures. Given the new conversation is determined, the present embodiment extracts the members and the new content of the conversation.

If a new conversation is created, then a link is added to existing conversations and the point which the conversation diverged. According to at least one implementation, the members of the new conversation are notified as well as the members of the previous conversation. Members of the new conversation may be marked as required or optional participants.

It may be appreciated that FIG. 2 provides only an illustration of one implementation and does not imply any limitations with regard to how different embodiments may be implemented. Many modifications to the depicted environments may be made based on design and implementation requirements. For example, as previously described, the Dynamic Thread Management for Online Conversations program 116A, 116B (FIG. 1) may implement a feedback loop for better accuracy. Also, profiles may be established for each member who is prompted to create a new conversation. Additionally, the present embodiment may be triggered only after a set period of time has elapsed. Furthermore, in accordance with an alternate implementation, the present embodiment may automatically add people to watch, to ignore, or to participate in roles for the new conversation. Also, only relevant members of a conversation (Reply-To who, Root user) may be selected to participate in the new conversation.

Figure 3:
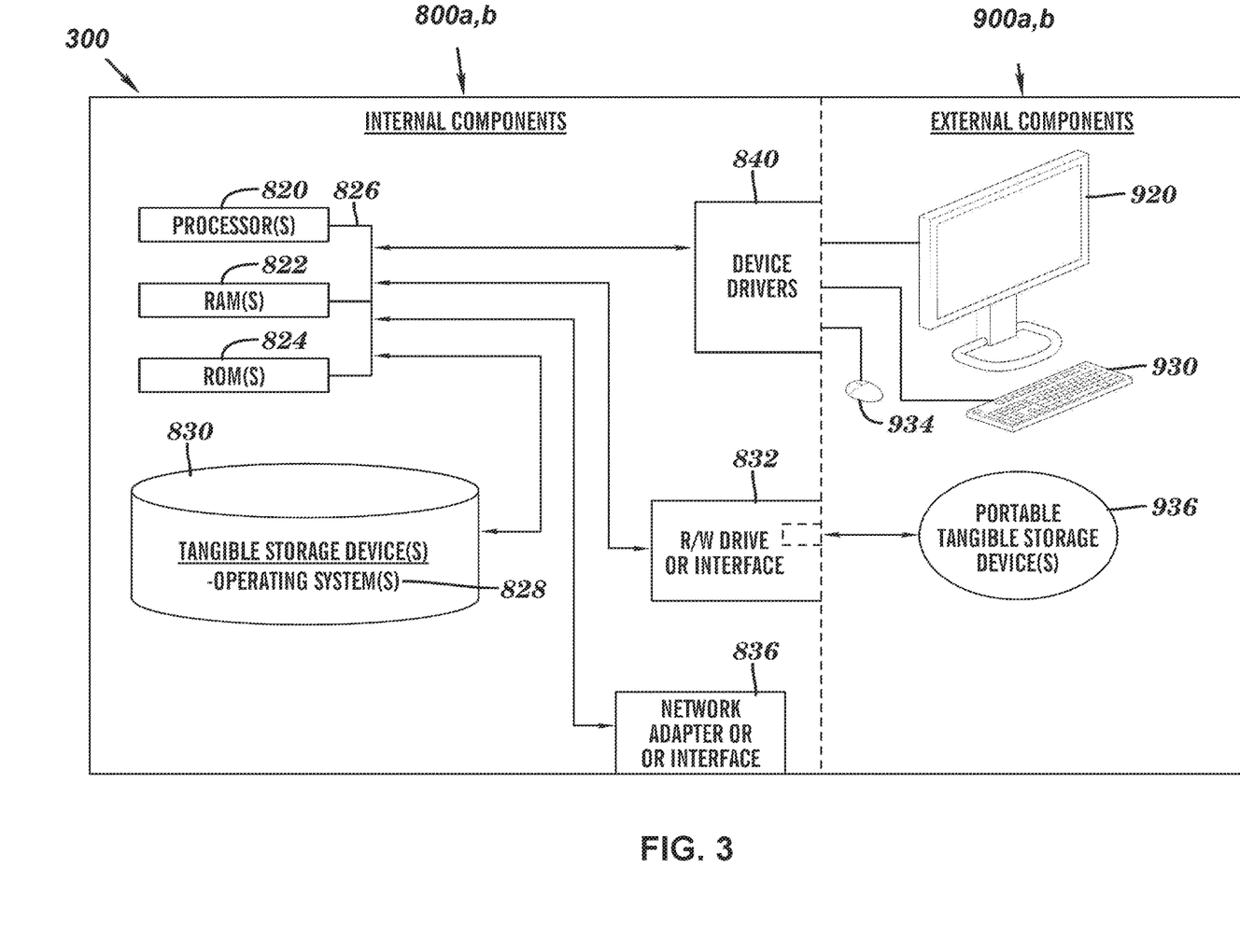
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800a,b and external components 900a,b illustrated in FIG. 3. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Dynamic Thread Management for Online Conversations program 116A (FIG. 1) in client computer 102 (FIG. 1) and the Dynamic Thread Management for Online Conversations program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Dynamic Thread Management for Online Conversations program 116A, 116B (FIG. 1) can be stored on one or more of the respective portable computer-readable tangible storage devices 936, read via the respective R/W drive or interface 832 and loaded into the respective hard drive 830.

Each set of internal components 800a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Dynamic Thread Management for Online Conversations program 116A (FIG. 1) in client computer 102 (FIG. 1) and the Dynamic Thread Management for Online Conversations program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Dynamic Thread Management for Online Conversations program 116A (FIG. 1) in client computer 102 (FIG. 1) and the Dynamic Thread Management for Online Conversations program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900a,b can include a computer display monitor 920, a keyboard 930, and a computer mouse 934. External components 900a,b can also include touch screens, virtual keyboards, touch pads, pointing devices, and other human interface devices. Each of the sets of internal components 800a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
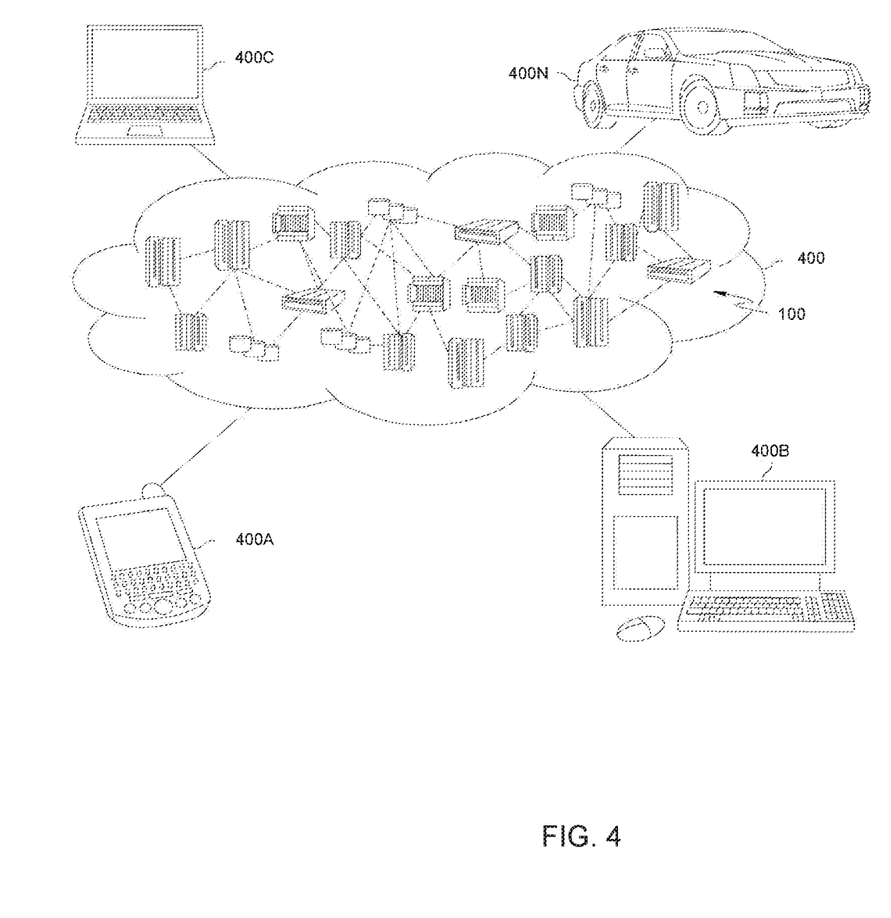
FIG. 4 is a block diagram of an illustrative cloud computing environment including the computer system depicted in FIG. 1, in accordance with an embodiment of the present disclosure.

Referring now to FIG. 4, illustrative cloud computing environment 400 is depicted. As shown, cloud computing environment 400 comprises one or more cloud computing nodes 100 with which local computing devices used by cloud consumers, such as, for example, personal digital assistant (PDA) or cellular telephone 400A, desktop computer 400B, laptop computer 400C, and/or automobile computer system 400N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 100 and cloud computing environment 400 can communicate with any type of computerized device over any type of network and/or network addressable connection (e.g., using a web browser).

Figure 5:
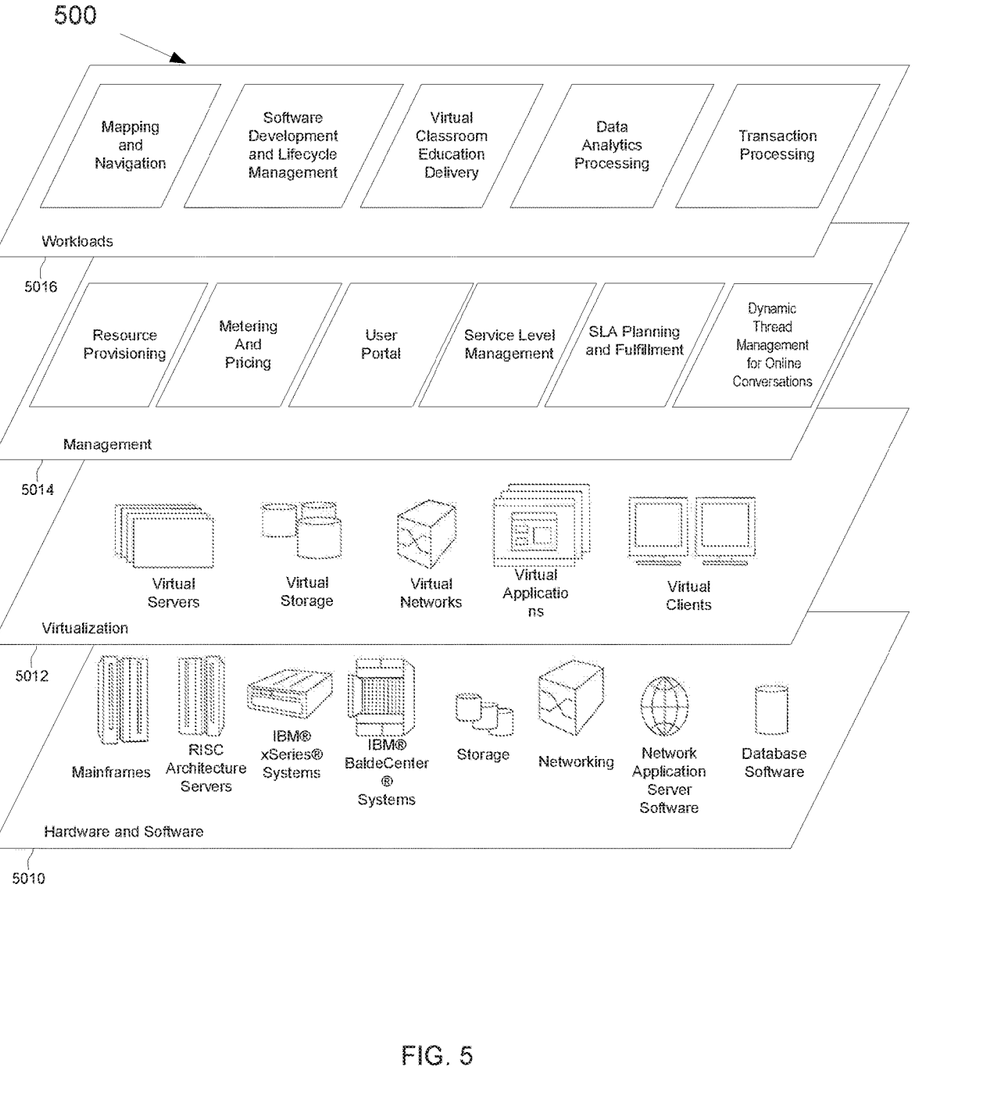
FIG. 5 is a block diagram of functional layers of the illustrative cloud computing environment of FIG. 4, in accordance with an embodiment of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 5010 includes hardware and software components. Examples of hardware components include: mainframes; RISC (Reduced Instruction Set Computer) architecture based servers; storage devices; networks and networking components. In some embodiments, software components include network application server software.

Virtualization layer 5012 provides an abstraction layer from which the following examples of virtual entities may be provided: virtual servers; virtual storage; virtual networks, including virtual private networks; virtual applications and operating systems; and virtual clients.

In one example, management layer 5014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A Dynamic Thread Management for Online Conversations program may monitor an online forum or conversation for new conversation elements and extract the new part of the conversation (content and members). Additionally, the Dynamic Thread Management for Online Conversations program may create a new conversation based on the content of extracted new part of the conversation and notify members of the previous conversation.

Workloads layer 5016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for creating at least one new thread associated with an online conversation, the method comprising:

determining if a predetermined time period has elapsed;

in response to determining the predetermined time period has elapsed, monitoring the online conversation to detect a new or updated element of the online conversation, wherein the detected new or updated element is selected from a group consisting of a new topic, a change of technical detail, a change of tone, a different user, and a time delay;

extracting the detected new or updated element;

analyzing the online conversation and the extracted detected new or updated element to determine if a new online conversation has started;

extracting a plurality of members associated with the online conversation based on the determination that a new online conversation has started;

extracting a plurality of content associated with the extracted detected new or updated element based on the determination that a new online conversation has started;

prompting a user to determine if a new online conversation should be created, wherein the user created the extracted detected new or updated element;

creating the new online conversation based on the user determining that the new conversation should be created;

in response to creating the new online conversation and in response to the user triggering an interface gesture to start the new online conversation, notifying the plurality of extracted members about the created new online conversation;

suggesting a plurality of new participants to the user;

prompting the user to select a plurality of required and optional members from the notified plurality of extracted members and the suggested plurality of new participants to participate in the created new online conversation; and enabling the added plurality of required and optional members plurality of new participants to participate in the created new online conversation.

2. The method of claim 1, wherein the online conversation is associated with at least one of an instant messaging (IM) service, a short message service (SMS), a blog, a web site, a community, a news feed, an email application, a forum and a wiki.

3. The method of claim 1, wherein prompting the user to determine if a new online conversation should be created comprises enabling the user to create a new conversation via a hashtag, a button, typing a response, or a plurality of other user interface gestures.

4. The method of claim 1, wherein creating the new online conversation comprises adding at least one link to the online conversation at a point which the online conversation diverged.

5. The method of claim 1, wherein creating the new online conversation comprises prompting the user to add a plurality of required people and a plurality of optional people to a notification of the new conversation.

6. The method of claim 1, wherein a plurality of metrics is used to detect a new or updated element of the online conversation.

7. The method of claim 6, wherein the plurality of metrics includes a difference of a preceding entry timestamp associated with the online conversation and a new entry associated with the online conversation being outside a threshold; the online conversation being outside a time expiry; analyzing a subject who is addressed or mentioned in the online conversation; analyzing a plurality of vectors and a direction of the conversation; or determining a change in an entry, a subject matter, or a topic associated with the online conversation.

8. A computer system for creating at least one new thread associated with an online conversation, the computer system comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

determining if a predetermined time period has elapsed;

in response to determining the predetermined time period has elapsed, monitoring the online conversation to detect a new or updated element of the online conversation, wherein the detected new or updated element is selected from a group consisting of a new topic, a change of technical detail, a change of tone, a different user, and a time delay;

extracting the detected new or updated element;

analyzing the online conversation and the extracted detected new or updated element to determine if a new online conversation has started;

extracting a plurality of members associated with the online conversation based on the determination that a new online conversation has started;

extracting a plurality of content associated with the extracted detected new or updated element based on the determination that a new online conversation has started;

prompting a user to determine if a new online conversation should be created, wherein the user created the extracted detected new or updated element;

creating the new online conversation based on the user determining that the new conversation should be created;

in response to creating the new online conversation and in response to the user triggering an interface gesture to start the new online conversation, notifying the plurality of extracted members about the created new online conversation;

suggesting a plurality of new participants to the user;

prompting the user to select a plurality of required and optional members from the notified plurality of extracted members and the suggested plurality of new participants to participate in the created new online conversation; and enabling the added plurality of required and optional members plurality of new participants to participate in the created new online conversation.

9. The computer system of claim 8, wherein the online conversation is associated with at least one of an instant messaging (IM) service, a short message service (SMS), a blog, a web site, a community, a news feed, an email application, a forum and a wiki.

10. The computer system of claim 8, wherein prompting the user to determine if a new online conversation should be created comprises enabling the user to create a new conversation via a hashtag, a button, typing a response, or a plurality of other user interface gestures.

11. The computer system of claim 8, wherein creating the new online conversation comprises adding at least one link to the online conversation at a point which the online conversation diverged.

12. The computer system of claim 8, wherein creating the new online conversation comprises prompting the user to add a plurality of required people and a plurality of optional people to a notification of the new conversation.

13. The computer system of claim 8, wherein a plurality of metrics is used to detect a new or updated element of the online conversation.

14. The computer system of claim 13, wherein the plurality of metrics includes a difference of a preceding entry timestamp associated with the online conversation and a new entry associated with the online conversation being outside a threshold; the online conversation being outside a time expiry; analyzing a subject who is addressed or mentioned in the online conversation; analyzing a plurality of vectors and a direction of the conversation; or determining a change in an entry, a subject matter, or a topic associated with the online conversation.

15. A computer program product for creating at least one new thread associated with an online conversation, the computer program product comprising:

one or more computer-readable storage devices and program instructions stored on at least one of the one or more tangible storage devices, the program instructions executable by a processor via at least one or more memories, the program instructions comprising:

program instructions to determine if a predetermined time period has elapsed;

in response to determining the predetermined time period has elapsed, program instructions to monitor, by a processor, the online conversation to detect a new or updated element of the online conversation, wherein the detected new or updated element is selected from a group consisting of a new topic, a change of technical detail, a change of tone, a different user, and a time delay;

program instructions to extract the detected new or updated element;

program instructions to analyze the online conversation and the extracted detected new or updated element to determine if a new online conversation has started;

program instructions to extract a plurality of members associated with the online conversation based on the determination that a new online conversation has started;

program instructions to extract a plurality of content associated with the extracted detected new or updated element based on the determination that a new online conversation has started;

program instructions to prompt a user to determine if a new online conversation should be created, wherein the user created the extracted detected new or updated element;

program instructions to create the new online conversation based on the user determining that the new conversation should be created;

in response to creating the new online conversation and in response to the user triggering an interface gesture to start the new online conversation, program instructions to notify the plurality of extracted members about the created new online conversation;

program instructions to suggest a plurality of new participants to the user;

program instructions to prompt the user to select a plurality of required and optional members from the notified plurality of extracted members and the suggested plurality of new participants to participate in the created new online conversation; and program instructions to enable the added plurality of required and optional members plurality of new participants to participate in the created new online conversation.

16. The computer program product of claim 15, wherein the online conversation is associated with at least one of an instant messaging (IM) service, a short message service (SMS), a blog, a web site, a community, a news feed, an email application, a forum and a wiki.

17. The computer program product of claim 15, wherein prompting the user to determine if a new online conversation should be created comprises enabling the user to create a new conversation via a hashtag, a button, typing a response, or a plurality of other user interface gestures.

* * * * *